United States Patent Office 2,713,130
Patented July 12, 1955

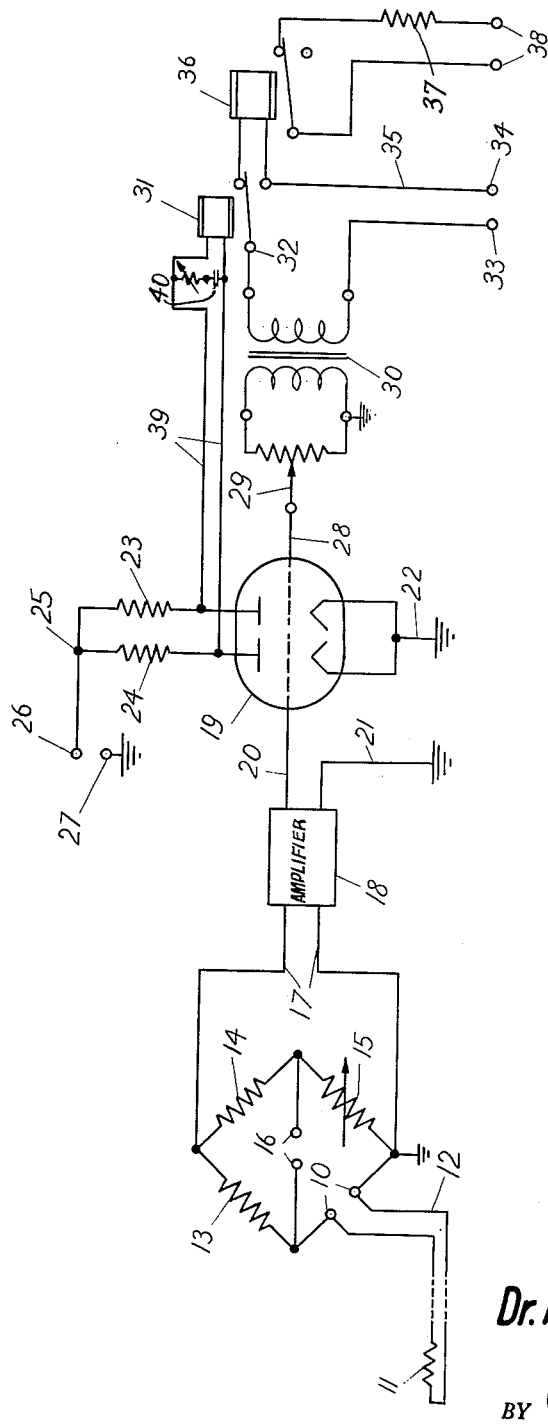

2,713,130

CONTROL CIRCUIT

Paul G. Weiller, New York, N. Y.

Application December 2, 1953, Serial No. 395,777

5 Claims. (Cl. 317—132)

This invention relates to a sensitive control circuit for use in many types of measurements and control where extreme sensitivity is required and specifically it refers to a sensitive relay control circuit for use in temperature control and similar operations where an extremely small signal or increment has to operate a relay to carry out secondary control functions.

In temperature control operations requiring extreme accuracy and working inside of very small changes in temperature has heretofore been necessary to use sensitive galvanometers for accuracy. Such galvanometers and contact making devices were little suited for automatic operation and recently it has therefore not been possible to control temperatures accurately down to a small fraction of a degree. In modern scientific and industrial processes it is often necessary to control temperatures down to 100th or even 1000th of a degree Fahrenheit. This was heretofore impossible. The present sensitive control circuit has made it possible to produce a simple and rugged control instrument which will automatically carry on such fine control over any desired length of time.

The main object of my invention is to produce a sensitive relay control circuit which will be positive and reliable in operation and which will be sensitive to infinitesimal changes in signal.

Another object of my invention is to provide a sensitive control circuit which is made up from commonly used electronic components and which can be manufactured at low cost.

An ancillary object of my invention is to produce a sensitive control circuit which is reliable in operation over long periods of time and which requires very little servicing in the field.

Still another object of my invention is to provide a sensitive relay control circuit of such compactness and light weight that it can be used in remote locations, airplanes and missiles, etc.

Other objects and advantages of my invention will be apparent in the course of the following description and claims.

In the accompanying drawing, forming part of this specification, in which light numerals designate like parts throughout the same, The figure presents a schematic diagram of a sensitive control circuit embodying my invention.

In the drawing wherein for the purpose of illustration is shown a preferred embodiment of my invention, the numeral 10 designates a pair of terminals which are connected to the signal source, which in this case may be the resistance thermometer 11 located at a remote location and connected to the terminals 10 by means of leads 12. The terminals 10 are a part of the bridge circuit consisting of ratio resistors 13 and 14 and the adjustable arm 15. This circuit has two more terminals 16 which connect to a suitable alternating current source. According to the type of application this may be a 60 cycle current from a bell transformer or other source of about 1½ to 4½ volts.

A pair of leads 17 connect the bridge circuit to the amplifier 18 which in this case may be a stable A. C. amplifier of any standard type. The output of the amplifier is connected to the grid of the dual tube 19 through lead 20 and is also connected to ground through the lead 21. The dual tube 19 may be a type 6SN7 or similar type of tube. The two cathodes of the tube are grounded through lead 22 and the two plates of same are connected to two resistors 23 and 24 which are tied together at 25 and connected to the terminal 26. A high voltage A. C. B-supply of 360 v. is connected between the terminals 26 and 27.

The other grid of the tube 19 is connected through lead 28 to the potentiometer 29 which is connected across secondary of transformer 30. The primary of the transformer 30 is connected to a relay 31 at point 32 and is also connected to terminal 33. A standard source of 115 v. A. C. is connected between terminals 33 and 34 and a lead 35 connects to one terminal of relay 36. The relay 31 is normally closed as indicated in Figure 1 and it serves to control the current in relay 36 which is also normally closed and which controls the desired operation by means of a heating element as indicated by resistor 37. A source of electric power is connected to terminals 38 and with relays in normal position as shown, the current will flow through heating element 37.

The coil of relay 31 is connected by means of leads 39 to the two plates of tube 19. A condenser 40 and sometimes also a series resistor are connected across said leads 39. The resistor is used in conjunction with condenser 40 when it is desired to change the period of the opening and closing of relay 31. This period or rhythm of the vibration of the contacts of relay 31 is used to proportion the amount of power put through heating element 37 by relay 36. If thus, for instance, the contacts of relay 31 are open half of the time, the heating element 37 will only receive 50% of the normal power, similarly with other proportions depending on the time and constant of vibration of the relay 31.

The operation of my invention is as follows: The bridge circuit is adjusted by means of the adjustable resistor 15 until zero current flows into the amplifier 18 at a given calibration temperature. If the temperature at the resistance thermometer 11 changes, then depending on whether same is higher or lower, a current will flow in the leads 17 and will be amplified by amplifier 18 and thereby put a signal on the grid of tube 19. At the same time current is applied to terminals 33 and 34 which will flow through the normally closed relay 31 into transformer 30, and the potentiometer 29 is adjusted until this current is in phase with the normal current exciting the grid on the left hand side of tube 19. At this point a normal plate current is flowing through tube 19 and the resistors 23 and 24 are of such proportion that a part of this plate current will flow through relay 31 and will normally keep same closed. The resistors 23 and 24 may be normally of a value of about 10,000 ohms. However, when a small difference in temperature appears at the resistance thermometer 11 a very minute current will flow through leads 17 into amplifier 18 and will bring the left hand grid of tube 19 out of phase with the pulse from the right hand grid. This arrangement is particularly sensitive to such changes so that even the most minute change will have the effect of blocking the plate current on one side, thereby producing a current through the relay and thus cause the relay to drop out. This will in turn open the circuit of relay 36 which will switch off the power from heating element 37. Now, due to the fact that heating element 37 is cooling off the temperature at the resistance thermometer 11 again drops, the left hand grid of tube 19 will then also drop, the left hand grid of tube 19 will again be phased with the right hand grid and the plate current will be restored whereupon relay 31 again closes and actuates relay 36 which in turn puts power into heating element 37. By this unique and extremely simple arrangement it is possible to obtain a sensitivity far exceeding anything heretofore known. As a matter of fact it has been possible for the inventor to control temperatures to an accuracy of 1/1000 degree Farenheit.

It is to be understood that the form of my invention herewith shown and described, is to be taken as a preferred example of the same and that various changes in the shape, size and arrangement of parts may be resorted to, without departing from the spirit of my invention or the scope of the subjoined claims.

Having thus described my invention, I claim:

1. In a sensitive relay circuit of the character described, the combination of a signal source; a dual triode tube having one grid connected to said signal source and having its cathodes grounded; a resistor connected to each of the plates of said dual tube with one end, the other ends of said resistors being tied together and being connected to a high voltage A. C. supply; a sensitive relay connected from one plate to the other of said dual tube; a low voltage supply connected to the operating contacts of said relay; a transformer connected in series with said low voltage supply through said contacts of said relay; a potentiometer connected to the secondary of said transformer and grounded at one end, the arm of said potentiometer being connected to the second grid of said dual tube, and a power relay operated by said sensitive relay.

2. In a sensitive relay circuit of the character described, the combination of a signal source, said source comprising a resistance thermometer; a bridge circuit connected to said resistance thermometer; an amplifier connected to the output leads of said bridge circuit; a dual triode having one grid connected to the output of said amplifier, the cathodes of said dual triode being connected to ground; a resistor connected in the plate leads of each plate of said dual triode the other ends of said resistors being tied together and being connected to a high voltage A. C. supply; a sensitive relay connected from one plate to the other, between said resistors and said dual triode; a current supply connected to the contacts of said sensitive relay; a transformer connected in series with said current supply through said relay contacts; a potentiometer connected to the secondary of said transformer, the arm of said potentiometer being connected to the second grid of said dual triode, and a power relay controlling a desired operation.

3. In a sensitive relay circuit of the character described, the combination of a signal source, said source comprising a resistance thermometer; an adjustable bridge circuit connected to said resistance thermometer; an amplifier connected to the output leads of said bridge circuit; a dual triode having one grid connected to the output of said amplifier, the cathodes of said dual triode being connected to ground; a resistor connected in the plate leads of each plate of said dual triode the other ends of said resistors being tied together and being connected to a high voltage A. C. supply; a sensitive relay connected from one plate to the other, between said resistors and said dual triode; a current supply connected to the normally closed contacts of said sensitive relay; a transformer connected in series with said current supply through said relay contacts; a potentiometer connected to the secondary of said transformer, the arm of said potentiometer being connected to the second grid of said dual triode, and a power relay controlling a desired operation operable by said sensitive relay.

4. In a sensitive relay circuit of the character described, the combination of a signal source, said source comprising a temperature responsive element; a sensitive zero balancing circuit connected to said temperature responsive element; a source of alternating current feeding said sensitive zero balancing circuit; an amplifier connected to the output leads of said zero balancing circuit; a dual triode having one grid connected to the output of said amplifier, the cathodes of said dual triode being connected to ground; a resistor connected in the plate leads of each plate of said dual triode the other ends of said resistors being tied together and being connected to a high voltage A. C. supply; a sensitive relay connected between the plates of said dual triode; a current supply to the normally closed contacts of said sensitive relay; a transformer having its primary connected in series with said current supply through said relay contacts; a phasing potentiometer connected to the secondary of said transformer, the arm of said potentiometer being connected to the second grid of said dual triode, and a power relay controlling a desired operation connected in series with said current supply and said transformer through sensitive relay contacts.

5. In a sensitive relay circuit of the character described the combination of a temperature responsive element; a sensitive bridge circuit connected to said temperature responsive element; an alternating current source connected to said bridge circuit; an amplifier connected to the output leads of said bridge circuit; a dual triode having one grid connected to the output of said amplifier, the cathodes of said dual triode being connected to ground; a resistor connected in the plate leads of each plate of said dual triode the other ends of said resistors being tied together and being connected to a high voltage A. C. supply; a sensitive relay connected between the plates of said dual triode; a condenser with an adjustable series resistor connected across the input leads of said sensitive relay; a current supply connected to the normally closed contacts of said sensitive relay; a transformer having its primary connected in series with said current supply through said relay contacts; a phasing potentiometer connected to the secondary of said transformer, the arm of said potentiometer being connected to the second grid of said dual triode, and a power relay controlling a desired operation connected in series with said current supply and said transformer through said contacts of said sensitive relay.

References Cited in the file of this patent

UNITED STATES PATENTS

| | | |
|---|---|---|
| 2,232,390 | Katzin | Feb. 18, 1941 |
| 2,328,056 | Cooley | Aug. 31, 1943 |
| 2,387,544 | Usselman | Oct. 23, 1945 |
| 2,396,497 | Eisenberg | Mar. 12, 1946 |
| 2,468,350 | Gunstein | Apr. 26, 1949 |
| 2,582,676 | Bordewick et al. | Jan. 15, 1952 |
| 2,593,562 | Hornfeck | Apr. 22, 1952 |
| 2,614,227 | Bordewick et al. | Oct. 14, 1952 |
| 2,632,846 | Hornfeck | Mar. 24, 1953 |